(12) United States Patent
Sarwer et al.

(10) Patent No.: US 11,336,897 B2
(45) Date of Patent: May 17, 2022

(54) METHOD AND APPARATUS FOR CODING VIDEO DATA IN PALETTE MODE

(71) Applicant: ALIBABA GROUP HOLDING LIMITED, Grand Cayman (KY)

(72) Inventors: Mohammed Golam Sarwer, Cupertino, CA (US); Yan Ye, San Diego, CA (US); Jiancong Luo, Skillman, NJ (US); Ru-Ling Liao, Beijing (CN)

(73) Assignee: ALIBABA GROUP HOLDING LIMTTED, Grand Cayman (KY)

( * ) Notice: Subject to any disclaimer, the term of this patent is extended or adjusted under 35 U.S.C. 154(b) by 0 days.

(21) Appl. No.: 16/950,325

(22) Filed: Nov. 17, 2020

(65) Prior Publication Data
US 2021/0203953 A1 Jul. 1, 2021

Related U.S. Application Data

(60) Provisional application No. 62/954,843, filed on Dec. 30, 2019.

(51) Int. Cl.
*H04N 19/157* (2014.01)
*H04N 19/70* (2014.01)
(Continued)

(52) U.S. Cl.
CPC ......... *H04N 19/157* (2014.11); *H04N 19/105* (2014.11); *H04N 19/186* (2014.11); *H04N 19/70* (2014.11)

(58) Field of Classification Search
CPC .... H04N 19/157; H04N 19/70; H04N 19/105; H04N 19/186
(Continued)

(56) References Cited

U.S. PATENT DOCUMENTS

2015/0341643 A1* 11/2015 Xu ................ H04N 19/176
375/240.02
2015/0341655 A1* 11/2015 Joshi .............. H04N 19/50
375/240.16
(Continued)

FOREIGN PATENT DOCUMENTS

WO  WO 2017/206805 A1  12/2017
WO  WO-2020243295 A1 * 12/2020 ............. H04N 19/50

OTHER PUBLICATIONS

International Telecommunications Union "Series H: Audiovisual and Multimedia Systems Infrastructure of audiovisual services—Coding of moving video," ITU-T Telecommunications Standardization Sector of ITU, pp. 1-317 (2013).
(Continued)

*Primary Examiner* — Marnie A Matt
(74) *Attorney, Agent, or Firm* — Finnegan, Henderson, Farabow, Garrett & Dunner, LLP

(57) ABSTRACT

Methods for performing palette coding of video data may include: determining whether a luma component of a coding unit (CU) and chroma components of the CU are coded jointly or separately in a palette mode; and in response to the luma component and the chroma components being coded jointly in the palette mode, determining a first maximum palette-table size for the CU; determining a first maximum palette-predictor size for the CU; and predicting the CU based on the first maximum palette-table size and the first maximum palette-predictor size.

20 Claims, 18 Drawing Sheets

(51) Int. Cl.
*H04N 19/105* (2014.01)
*H04N 19/186* (2014.01)

(58) Field of Classification Search
USPC .................................................. 375/240.12
See application file for complete search history.

(56) References Cited

U.S. PATENT DOCUMENTS

| | | | |
|---|---|---|---|
| 2016/0227239 A1* | 8/2016 | Pu | H04N 19/176 |
| 2016/0234498 A1* | 8/2016 | Misra | H04N 19/593 |
| 2017/0374372 A1* | 12/2017 | Liu | H04N 19/103 |
| 2019/0281311 A1 | 9/2019 | Ye et al. | |
| 2020/0092546 A1* | 3/2020 | Ye | H04N 19/105 |
| 2020/0288145 A1* | 9/2020 | Chuang | H04N 19/11 |

OTHER PUBLICATIONS

Gary J. Sullivan et al. "Overview of the High Efficiency Video Coding (HEVC) Standard," IEE Transactions on Circuits and Systems for Video Technology, vol. 22, No. 12, pp. 1649-1667 (2012).

Jianle Chen et al. "Algorithm Description of Joint Exploration Test Model 7 (JEM 7)," Joint Video Exploration Team (JVET), $7^{th}$ Meeting: Torino, IT, JVET-G1001-v1. pp. 1-50 (2017).

Andrew Segall et al. "Joint Call for Proposals on Video Compression with Capability beyond HEVC," Joint Video Exploration Team (JVET) of ITU-T $8^{th}$ Meeting: Macao, CN, pp. 1-28 (2017).

Benjamin Bross et al. "Versatile Video Coding (Draft 5)," Joint Video Experts Team (JVET) of ITU-T, $14^{th}$ Meeting: Geneva, CH, pp. 1-399 (2019).

Yung-Hsuan Chao et al. "CE8-1.3: Line-based CG Palette Mode," Joint Video Experts Team (JVET) of ITU-T $16^{th}$ Meeting: Geneva, CH, pp. 1-6 (2019).

Benjamin Bross et al. "Versatile Video Coding (Draft 7)," Joint Video Experts Team (JVET) of ITU-T, $16^{th}$ Meeting: Geneva, CH, pp. 1-491 (2019).

Jianle Chen et al. "Algorithm description for Versatile Video Coding and Test Model 7 (VTM 7)," Joint Video Experts Team (JVET) of ITU-T, $16^{th}$ Meeting: Geneva, CH, pp. 1-90 (2019).

International search report and written opinion in related International Application No. PCT/US20/60852, dated Feb. 24, 2021 (21 pages).

* cited by examiner

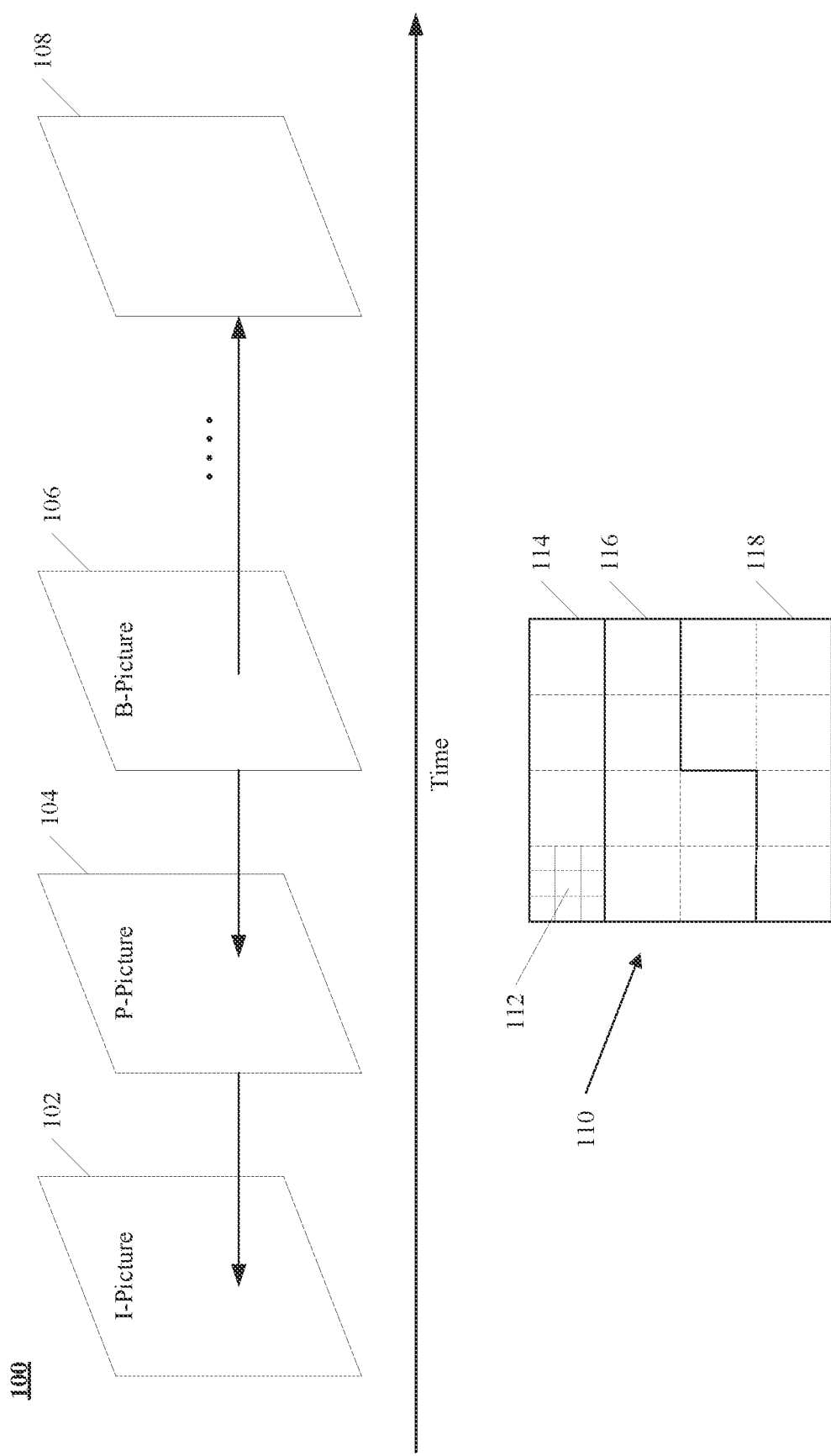

Example of a block coded in palette mode

Table 1: Exemplary uniform maximum predictor sizes and maximum palette sizes

| |
|---|
| maximum palette predictor size for both joint and separate palettes: 63 |
| maximum palette size for both joint and separate palette tables: 31 |

FIG. 7

Table 2: Exemplary maximum predictor sizes and maximum palette sizes

| | |
|---|---|
| Maximum palette predictor sizes | max_plt_predictor_size_joint: 63 |
| | max_plt_predictor_size_luma: 31 |
| | max_plt_predictor_size_chroma: 31 |
| Maximum palette sizes | max_plt_size_joint: 31 |
| | max_plt_size_luma: 15 |
| | max_plt_size_chroma: 15 |

FIG. 8

Table 3: Exemplary decoding process for using predefined maximum palette predictor sizes and maximum palette sizes

---

8.4.5.3  Decoding process for palette mode

901  *The variable localDualtree is derived as follows:*
*localDualtree = treeType != SINGLE_TREE && ( slice_type != I | | ( slice_type = = I &&*
*qtbtt_dual_tree_intra_flag = = 0 ) ) ? 1 : 0*

Depending on the value of treeType, the variables startComp, numComps *and maxPltPredSize* are derived as follows:
— If treeType is equal to SINGLE_TREE:
    startComp = 0
    numComps = 3

902      *maxPltPredSize = max_plt_predictor_size_joint*
— Otherwise, treeType is equal to DUAL_TREE_LUMA:
    startComp = 0
    numComps = 1

903      *maxPltPredSize = localDualtree ? max_plt_predictor_size_joint : max_plt_predictor_size_joint_luma*
— Otherwise, treeType is equal to DUAL_TREE_CHROMA:
    startComp = 1
    numComps = 2

904      *maxPltPredSize = = localDualtree ? max_plt_predictor_size_joint : max_plt_predictor_size_chroma* the value PredictorPaletteSize[ startComp ] and the array PredictorPaletteEntries are derived or modified as follows:

```
for( i = 0; i < CurrentPaletteSize[ startComp ]; i++ )
    for( compIdx = startComp; compIdx < (startComp + numComps); compIdx++ )
        newPredictorPaletteEntries[ compIdx ][ i ] = CurrentPaletteEntries[ compIdx ][ i ]
newPredictorPaletteSize = CurrentPaletteSize[ startComp ]
```

905  `for( i = 0; i < PredictorPaletteSize[ startComp ] && newPredictorPaletteSize < 63 maxPltPredSize; i++ )`

```
        if( !PalettePredictorEntryReuseFlags[ i ] ) {
            for( compIdx = startComp; compIdx < (startComp + numComps); compIdx++ )            (460)
                newPredictorPaletteEntries[ compIdx ][ newPredictorPaletteSize ] =
                    PredictorPaletteEntries[ compIdx ][ i ]
            newPredictorPaletteSize++
        }
    for( compIdx = startComp; compIdx < ( startComp + numComps ); compIdx++ )
        for( i = 0; i < newPredictorPaletteSize; i++ )
            PredictorPaletteEntries[ compIdx ][ i ] = newPredictorPaletteEntries[ compIdx ][ i ]
    PredictorPaletteSize[ startComp ] = newPredictorPaletteSize
```

906  It is a requirement of bitstream conformance that the value of PredictorPaletteSize[ startComp ] shall be in the range of 0 to 63 *maxPltPredSize*, inclusive.

FIG. 9

Table 4: Exemplary palette coding syntax table for using predefined maximum palette predictor sizes and maximum palette sizes

| palette_coding( x0, y0, cbWidth, cbHeight, treeType ) { | Descriptor |
|---|---|
|   startComp = ( treeType = = DUAL_TREE_CHROMA ) ? 1 : 0 | |
|   numComps = ( treeType = = SINGLE_TREE ) ? 3 :<br>              ( treeType = = DUAL_TREE_CHROMA ) ? 2 : 1 | |
|   *maxNumPltEntries = ( treeType = = SINGLE_TREE ) ? max_plt_size_joint:*<br>              *( treeType = = DUAL_TREE_CHROMA ) ? max_plt_size_chroma :*<br>  *max_plt_size_luma* | |
|   palettePredictionFinished = 0 | |
|   NumPredictedPaletteEntries = 0 | |
|   for( predictorEntryIdx = 0; predictorEntryIdx < PredictorPaletteSize[ startComp ] &&<br>    !palettePredictionFinished &&<br>    NumPredictedPaletteEntries < ~~31~~ *maxNumPltEntries*; predictorEntryIdx++ ) { | |
|     palette_predictor_run | ae(v) |
|     if( palette_predictor_run != 1 ) { | |
|       if( palette_predictor_run > 1 ) | |
|         predictorEntryIdx += palette_predictor_run - 1 | |
|       PalettePredictorEntryReuseFlags[ predictorEntryIdx ] = 1 | |
|       NumPredictedPaletteEntries++ | |
|     } else | |
|       palettePredictionFinished = 1 | |
|   } | |
|   if( NumPredictedPaletteEntries < ~~31~~ *maxNumPltEntries*) | |
|     num_signalled_palette_entries | ae(v) |

Table 5: Exemplary derivation of maximum palette sizes and maximum palette predictor size of separate palettes

| Maximum palette sizes | max_plt_size_joint = sps_max_plt_size_joint_minus1 + 1 |
|---|---|
| | max_plt_size_luma = max_plt_size_joint >> 1 |
| | max_plt_size_chroma = max_plt_size_joint >> 1 |
| Maximum palette predictor sizes | max_plt_predictor_size_joint = max_plt_size_joint + sps_delta_max_plt_predictor_size_joint |
| | max_plt_predictor_size_luma = max_plt_predictor_size_joint >> 1 |
| | max_plt_predictor_size_chroma = max_plt_predictor_size_joint >> 1 |

FIG. 11

Table 6: Exemplary derivation of maximum palette sizes and maximum palette predictor size of separate palettes

| Maximum palette sizes | max_plt_size_joint = sps_max_plt_size_joint_minus1 + 1 |
|---|---|
| | max_plt_size_chroma = max_plt_size_joint >> 2 |
| | max_plt_size_luma = max_plt_size_joint - max_plt_size_chroma |
| Maximum palette predictor sizes | max_plt_predictor_size_joint = max_plt_size_joint + sps_delta_max_plt_predictor_size_joint |
| | max_plt_predictor_size_chroma = max_plt_predictor_size_joint >> 2 |
| | max_plt_predictor_size_luma = max_plt_predictor_size_joint - max_plt_predictor_size_chroma |

FIG. 12

Table 7: Exemplary sequence parameter set (SPS) syntax table

| seq_parameter_set_rbsp( ) { | Descriptor |
|---|---|
|   if( ChromaArrayType != 0 ) | |
|     qtbtt_dual_tree_intra_flag | u(1) |
|   if( chroma_format_idc == 3 ) { | |
|     sps_palette_enabled_flag | u(1) |
|     sps_act_enabled_flag | u(1) |
|   } | |
|   *if(sps_palette_enabled_flag){* | |
|     *sps_max_plt_size_joint_minus1* | *u(6)* |
|     *sps_delta_max_plt_predictor_size_joint* | *u(6)* |
|   *}* | |

Table 8: Exemplary derivation of maximum palette sizes and maximum palette predictor size of separate palettes

| Maximum palette sizes | max_plt_size_joint = pic_max_plt_size_joint_minus1 + 1 |
|---|---|
| | max_plt_size_luma = max_plt_size_joint >> 1 |
| | max_plt_size_chroma = max_plt_size_joint >> 1 |
| Maximum palette predictor sizes | max_plt_predictor_size_joint = max_plt_size_joint + sps_delta_max_plt_predictor_size_joint |
| | max_plt_predictor_size_luma = max_plt_predictor_size_joint >> 1 |
| | max_plt_predictor_size_chroma = max_plt_predictor_size_joint >> 1 |

FIG. 14

Table 9: Exemplary derivation of maximum palette sizes and maximum palette predictor size of separate palettes

| Maximum palette sizes | max_plt_size_joint = pic_max_plt_size_joint_minus1 + 1 |
|---|---|
| | max_plt_size_chroma = max_plt_size_joint >> 2 |
| | max_plt_size_luma = max_plt_size_joint - max_plt_size_chroma |
| Maximum palette predictor sizes | max_plt_predictor_size_joint = max_plt_size_joint + sps_delta_max_plt_predictor_size_joint |
| | max_plt_predictor_size_chroma = max_plt_predictor_size_joint >> 2 |
| | max_plt_predictor_size_luma = max_plt_predictor_size_joint - max_plt_predictor_size_chroma |

FIG. 15

Table 10: Exemplary picture header (PH) syntax

| picture_header_rbsp( ) { | Descriptor |
|---|---|
|   non_reference_picture_flag | u(1) |
|   gdr_pic_flag | u(1) |
|   if( sps_scaling_list_enabled_flag ) { | |
|     pic_scaling_list_present_flag | u(1) |
|     if( pic_scaling_list_present_flag ) | |
|       pic_scaling_list_aps_id | u(3) |
|   } | |
|   *if(sps_palette_enabled_flag){* | |
|     *pic_max_plt_size_joint_minus1* | *u(6)* |
|     *pic_delta_max_plt_predictor_size_joint* | *u(6)* |
|   *}* | |
|   if( picture_header_extension_present_flag ) { | |
|     ph_extension_length | ue(v) |
|     for( i = 0; i < ph_extension_length; i++) | |
|       ph_extension_data_byte[ i ] | u(8) |
|   } | |
|   rbsp_trailing_bits( ) | |
| } | |

Table 11: Exemplary derivation of maximum palette sizes and maximum palette predictor sizes for I, P, and B slices

```
if (slice_type != I || qtbtt_dual_tree_intra_flag == 0) // single tree case
{
        max_plt_size_joint = slice_max_plt_size_joint_minus1 + 1
        max_plt_size_luma = max_plt_size_joint >> 1 // in case of local luma tree
        max_plt_size_chroma = max_plt_size_joint >> 1 // in case of local chroma tree
        max_plt_predictor_size_joint = max_plt_size_joint + slice_delta_max_plt_predictor_size_joint
        max_plt_predictor_size_luma = 0 // never use in this case
        max_plt_predictor_size_chroma = 0 // never use in this case
}
else
{
    max_plt_size_luma = slice_max_plt_size_luma_minus1 + 1
    max_plt_size_chroma = max_plt_size_luma
    max_plt_predictor_size_luma = max_plt_size_luma + slice_delta_max_plt_predictor_size_luma
    max_plt_predictor_size_chroma = max_plt_predictor_size_luma
    max_plt_size_joint = 0 // never used for this slice
    max_plt_predictor_size_joint = 0 // never used for this slice
}
```

FIG. 17

Table 12: Exemplary slice header (SH) syntax

| slice_header( ) { | Descriptor |
|---|---|
|   slice_pic_order_cnt_lsb | u(v) |
|   if( subpics_present_flag ) | |
|     slice_subpic_id | u(v) |
|   if( rect_slice_flag \|\| NumTilesInPic > 1 ) | |
|     slice_address | u(v) |
|   if( !rect_slice_flag && NumTilesInPic > 1 ) | |
|     num_tiles_in_slice_minus1 | ue(v) |
|   slice_type | ue(v) |
|   *if(sps_palette_enabled_flag){* | |
|     *if (slice_type != I \|\| qtbtt_dual_tree_intra_flag == 0) {* | |
|       *slice_max_plt_size_joint_minus1* | *u(6)* |
|       *slice_delta_max_plt_predictor_size_joint* | *u(6)* |
|     *}* | |
|     *if (slice_type == I && qtbtt_dual_tree_intra_flag) {* | |
|       *slice_max_plt_size_luma_minus1* | *u(6)* |
|       *slice_delta_max_plt_predictor_size_luma* | *u(6)* |
|     *}* | |
|   *}* | |
|   if( slice_header_extension_present_flag ) { | |
|     slice_header_extension_length | ue(v) |
|     for( i = 0; i < slice_header_extension_length; i++) | |
|       slice_header_extension_data_byte[ i ] | u(8) |
|   } | |
|   byte_alignment( ) | |
| } | |

FIG. 18

METHOD AND APPARATUS FOR CODING VIDEO DATA IN PALETTE MODE

CROSS-REFERENCE TO RELATED APPLICATIONS

The present disclosure claims priority to U.S. Provisional Application No. 62/954,843, filed on Dec. 30, 2019, which is incorporated herein by reference in its entirety.

TECHNICAL FIELD

The present disclosure generally relates to video processing, and more particularly, to methods and apparatuses for signaling and determining maximum palette-table sizes and maximum palette-predictor sizes based on the coding tree structure for lama and chroma components in a palette mode.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

In some embodiments, an exemplary palette coding method includes: determining whether a luma component of a coding unit (CU) and chroma components of the CU are coded jointly or separately in a palette mode; and in response to the luma component and the chroma components being coded jointly in the palette mode, determining a first maximum palette-table size for the CU; determining a first maximum palette-predictor size for the CU; and predicting the CU based on the first maximum palette-table size and the first maximum palette-predictor size.

In some embodiments, an exemplary video processing apparatus includes at least one memory for storing instructions and at least one processor. The at least one processor is configured to execute the instructions to cause the apparatus to perform: determining whether a luma component of a CU and chroma components of the CU are coded jointly or separately in a palette mode; and in response to the luma component and the chroma components being coded jointly in the palette mode, determining a first maximum palette-table size for the CU; determining a first maximum palette-predictor size for the CU; and predicting the CU based on the first maximum palette-table size and the first maximum palette-predictor size.

In some embodiments, an exemplary non-transitory computer readable storage medium stores a set of instructions. The set of instructions are executable by one or more processing devices to cause a video processing apparatus to perform: determining whether a luma component of a CU and chroma components of the CU are coded jointly or separately in a palette mode; and in response to the luma component and the chroma components being coded jointly in the palette mode, determining a first maximum palette-table size for the CU; determining a first maximum palette-predictor size for the CU; and predicting the CU based on the first maximum palette-table size and the first maximum palette-predictor size.

BRIEF DESCRIPTION OF THE DRAWINGS

Embodiments and various aspects of the present disclosure are illustrated in the following detailed description and the accompanying figures. Various features shown in the figures are not drawn to scale.

FIG. 1 is a schematic diagram illustrating structures of an example video sequence, according to some embodiments of the present disclosure.

FIG. 7 illustrates an exemplary Table 1 showing exemplary uniform maximum predictor sizes and maximum palette sizes, according to some embodiments of the present disclosure.

FIG. 8 illustrates an exemplary Table 2 showing exemplary maximum predictor sizes and maximum palette sizes, according to some embodiments of the present disclosure.

FIG. 9 illustrates an exemplary Table 3 showing exemplary decoding process for using predefined maximum palette predictor sizes and maximum palette sizes, according to some embodiments of the present disclosure.

FIG. 10 illustrates an exemplary Table 4 showing exemplary palette coding syntax table for using predefined maximum palette predictor sizes and maximum palette sizes, according to some embodiments of the present disclosure.

FIG. 11 illustrates an exemplary Table 5 showing exemplary derivation of maximum palette sizes and maximum palette predictor size of separate palettes, according to some embodiments of the present disclosure.

FIG. 12 illustrates an exemplary Table 6 showing another exemplary derivation of maximum palette sizes and maximum palette predictor size of separate palettes, according to some embodiments of the present disclosure.

FIG. 13 illustrates an exemplary Table 7 showing an exemplary sequence parameter set (SPS) syntax table, according to some embodiments of the present disclosure.

FIG. 14 illustrates an exemplary Table 8 showing another exemplary derivation of maximum palette sizes and maximum palette predictor size of separate palettes, according to some embodiments of the present disclosure.

FIG. 15 illustrates an exemplary Table 9 showing another exemplary derivation of maximum palette sizes and maximum palette predictor size of separate palettes, according to some embodiments of the present disclosure.

FIG. 16 illustrates an exemplary Table 10 showing an exemplary picture header (PH) syntax, according to some embodiments of the present disclosure.

FIG. 17 illustrates an exemplary Table 11 showing an exemplary derivation of maximum palette sizes and maximum palette predictor sizes for I, P, and B slices, according to some embodiments of the present disclosure.

FIG. 18 illustrates an exemplary Table 12 showing an exemplary slice header (SH) syntax, according to some embodiments of the present disclosure.

DETAILED DESCRIPTION

Figure 2A:
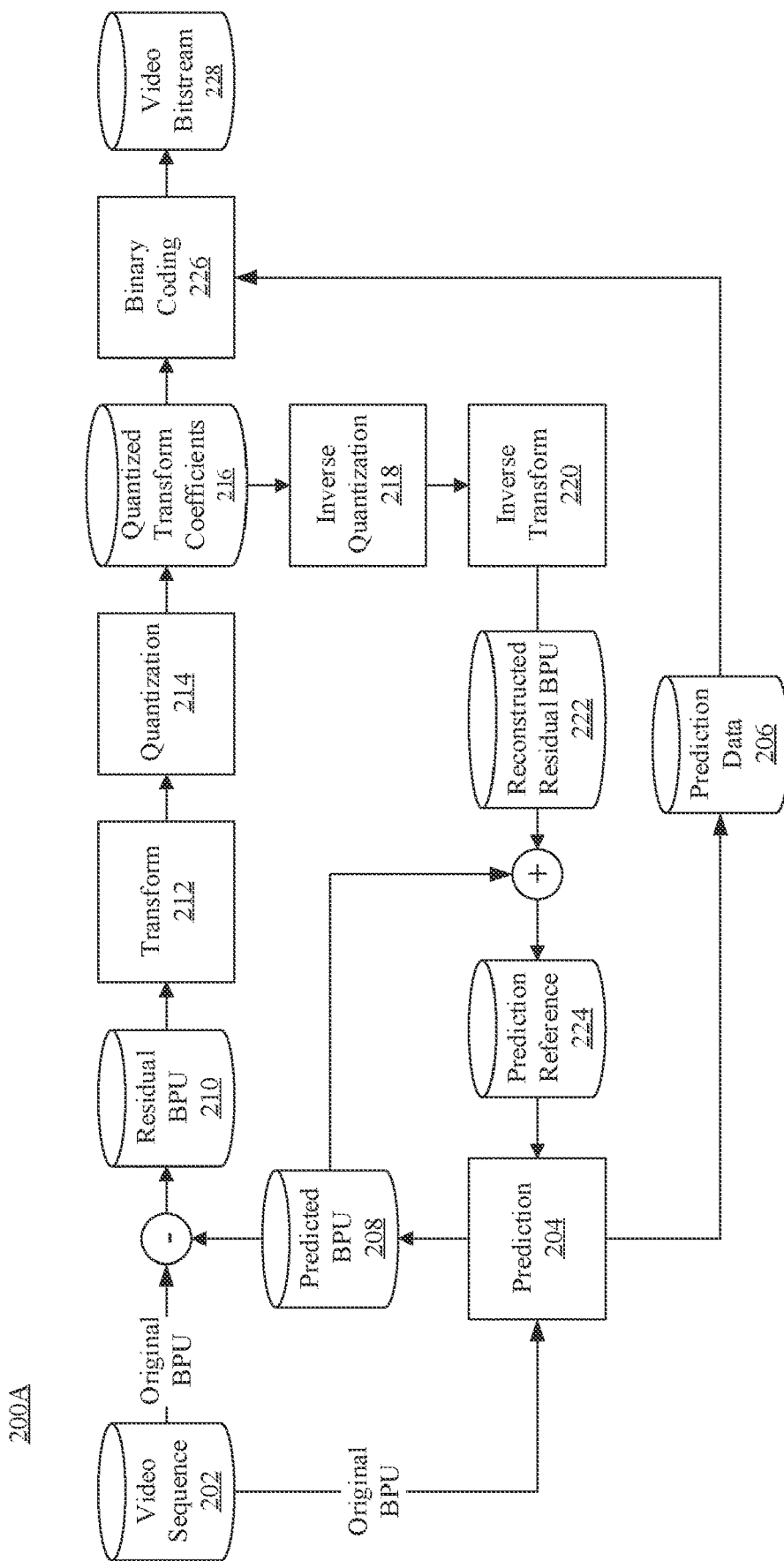
FIG. 2A is a schematic diagram illustrating an exemplary encoding process of a hybrid video coding system, consistent with embodiments of the disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

In order to achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recent, and continues to include more coding technologies that provide better compression performance. VVC is based on the same hybrid video coding system that has been used in modern video compression standards such as HEVC H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstructa picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a. previous picture as a reference picture is referred to as a "P-picture." A picture coded using both a previous picture and a future picture as reference pictures (i.e., the reference is "bi-directional") is referred to as a "B-picture."

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a time-line, including pictures 102, 104, 106 and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. some embodiments, the reference pictureof a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2B:
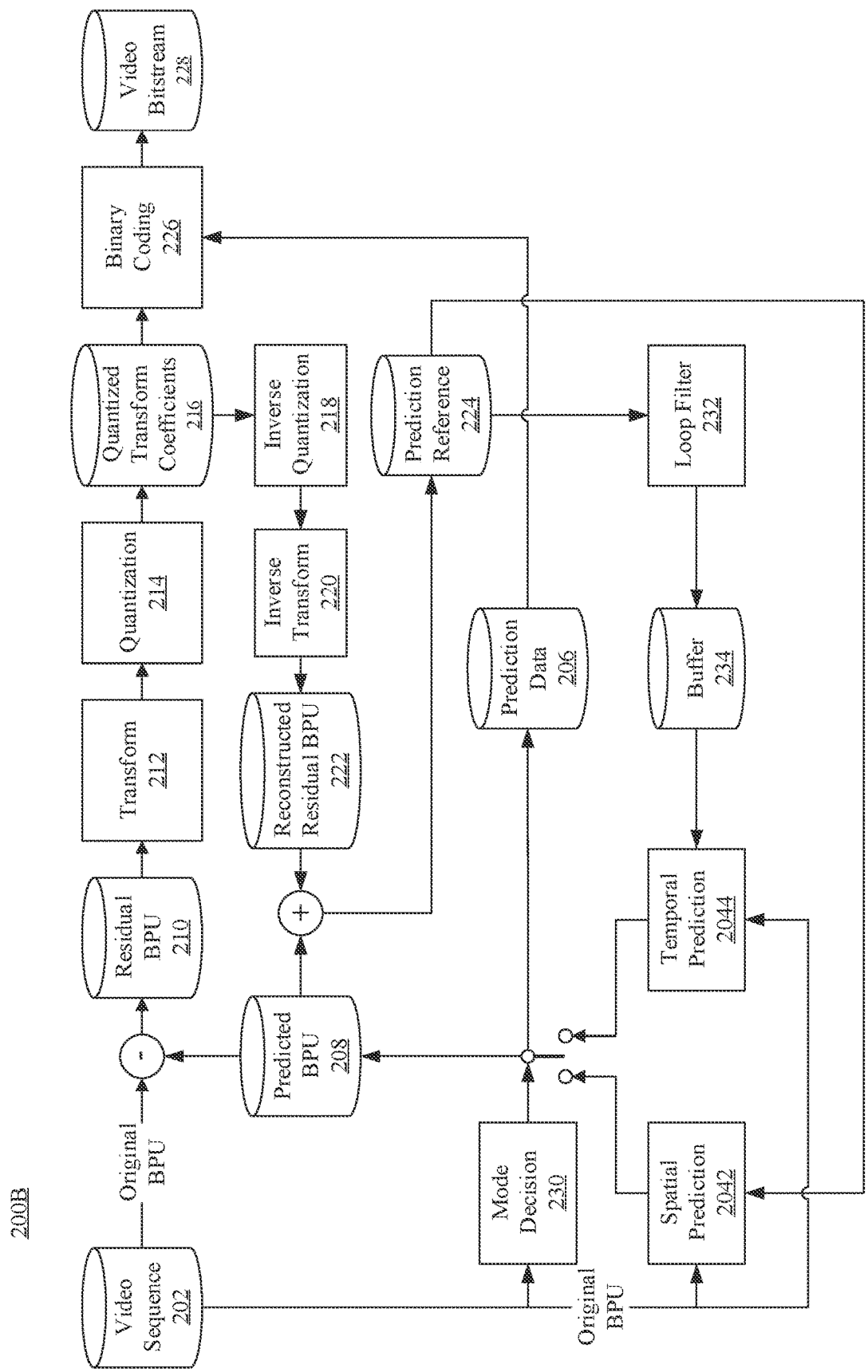
FIG. 2B is a schematic diagram illustrating another exemplary encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H2265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 10( ) can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214. the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage, In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like, For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
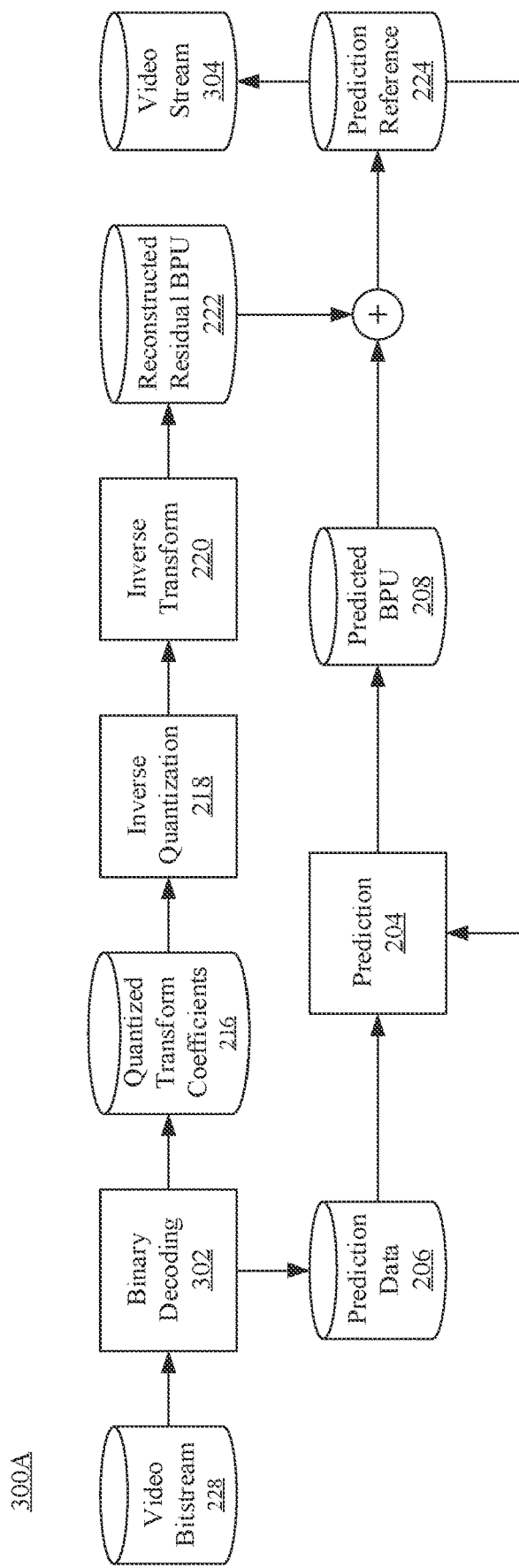
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
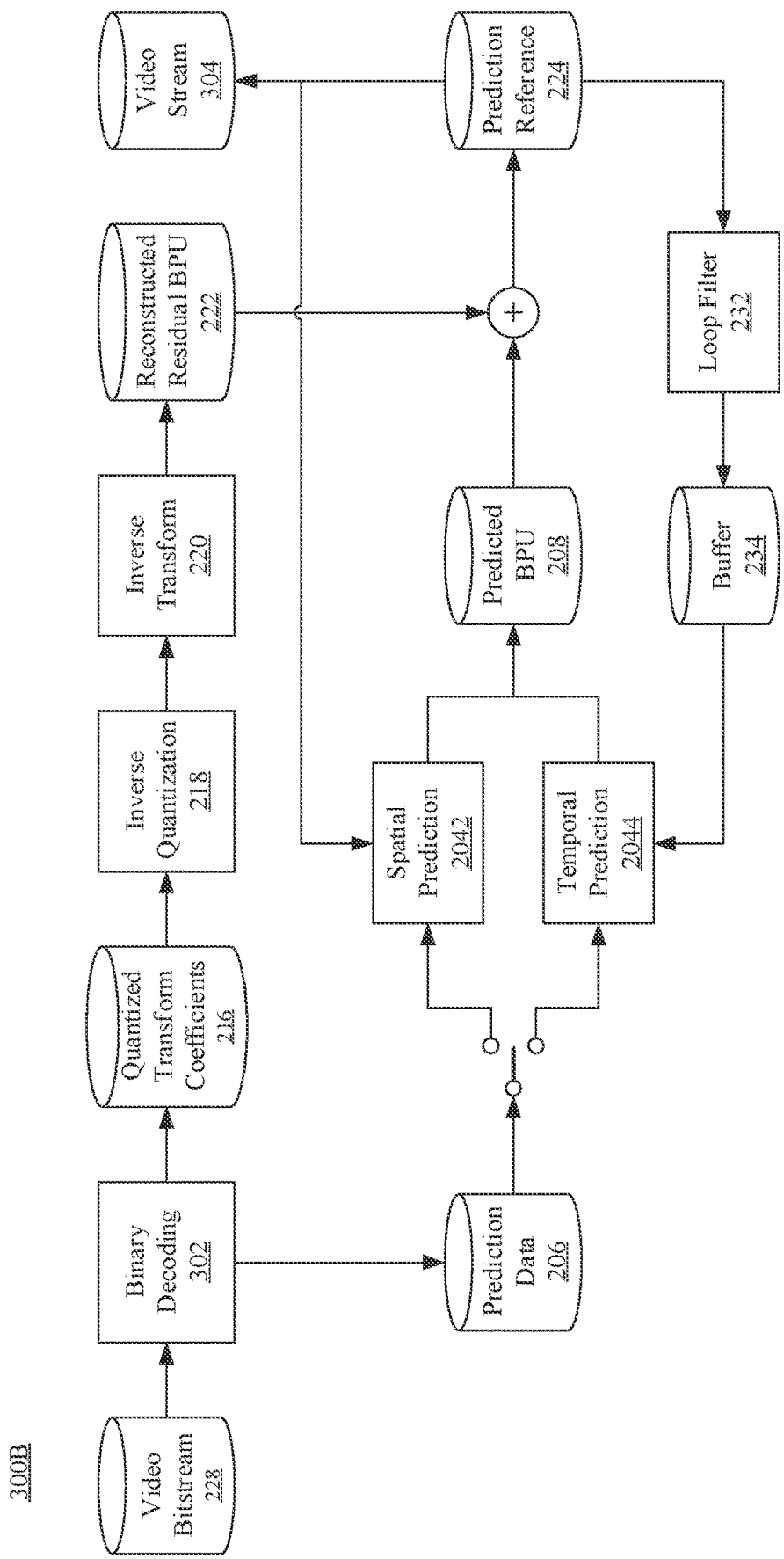
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
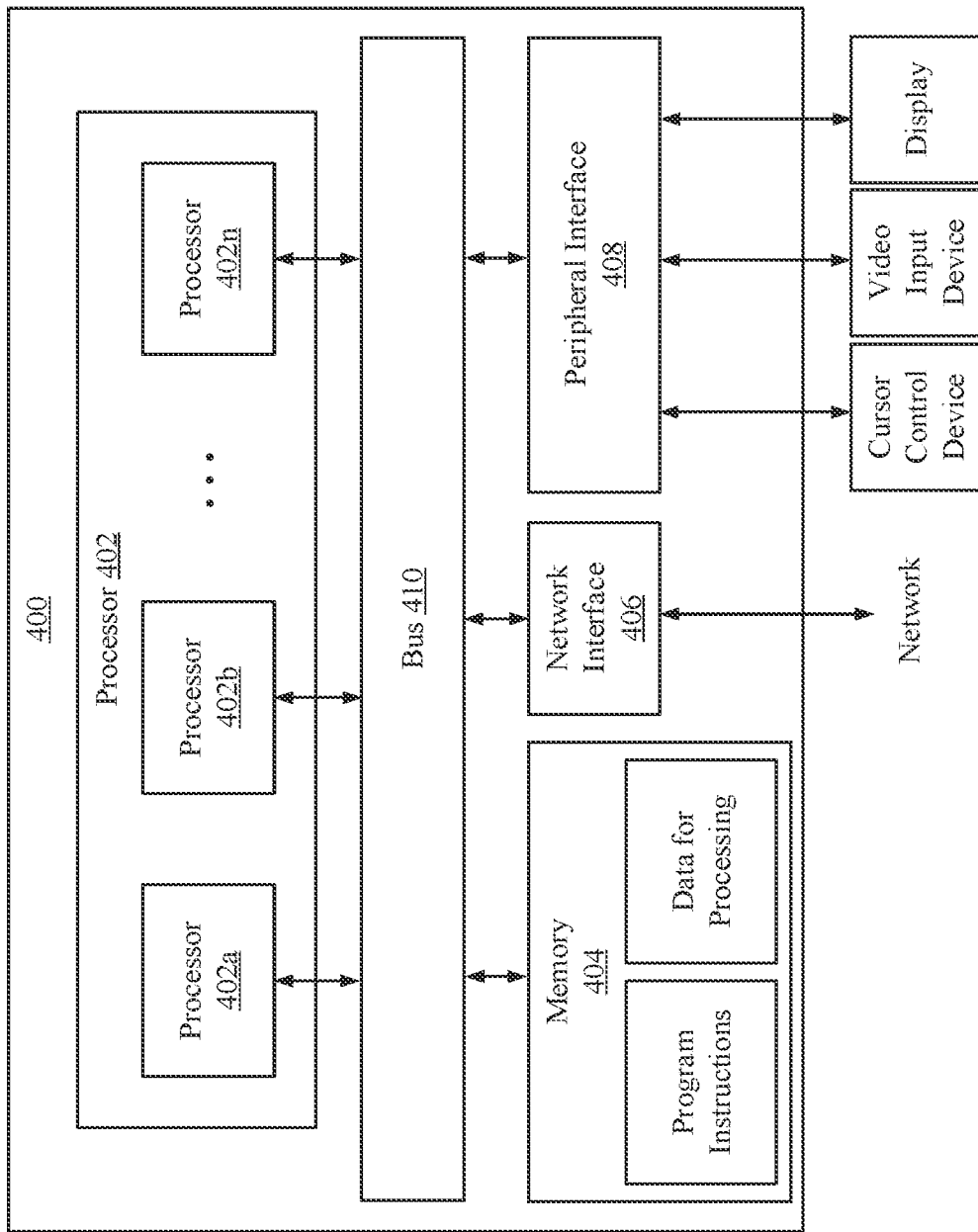
FIG. 4 is a block diagram of an exemplary apparatus for encoding or decoding a video, according to some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4. processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (MC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into emory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

In the quantization and inverse quantization functional blocks (e.g., quantization 214 and inverse quantization 218 of FIG. 2A or FIG. 2B, inverse quantization 218 of FIG. 3A or FIG. 3B), a quantization parameter (QP) is used to determine the amount of quantization (and inverse quantization) applied to the prediction residuals. initial QP values used for coding of a picture or slice may be signaled at the high level, for example, using init_qp_minus26 syntax element in the Picture Parameter Set (PPS) and using slice_qp_delta syntax element in the slice header. Further, the QP values may be adapted at the local level for each CU using delta QP values sent at the granularity of quantization groups.

In VVC, a palette mode can be used in 4:4:4 color format. When the palette mode is enabled, a flag is transmitted at the CU level if the CU size is smaller than or equal to 64×64 indicating whether the palette mode is used.

Figure 5:
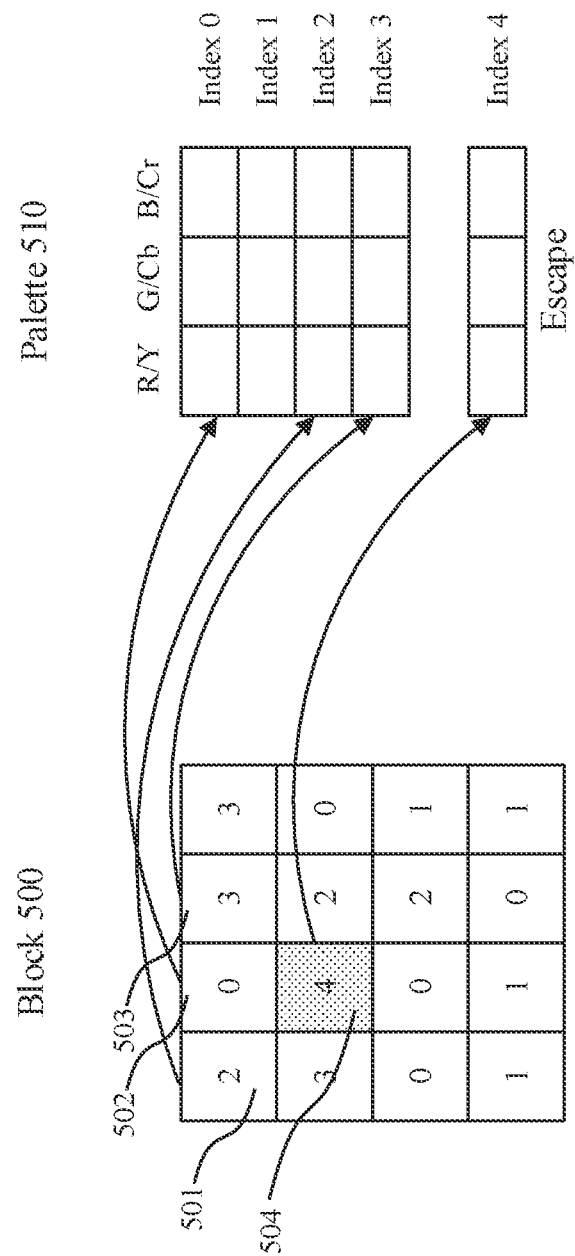
FIG. 5 illustrates a schematic diagram of an exemplary block coded in palette mode, according to sonic embodiments of the present disclosure.

FIG. 5 illustrates a schematic diagram of an exemplary block 500 coded in palette mode, according to some embodiments of the present disclosure. As shown in FIG. 5, if the palette mode is utilized to code the current CU (e.g., block 500), the sample values in each position (e.g., position 501, position 502, position 503, or position 504) in the CU are represented by a small set of representative color values. The set is referred to as a "palette" or "palette table" (e.g., palette 510). For sample positions with values close to the palette colors, the corresponding palette indices (e.g., index 0, index 1, index 2, or index 3) are signaled. According to some disclosed embodiments, a color value that is outside the palette table can be specified by signaling an escape index (e.g., index 4). Then, for all positions in the CU that uses the escape color index, the (quantized) color component values are signaled for each of these positions.

Figure 6:
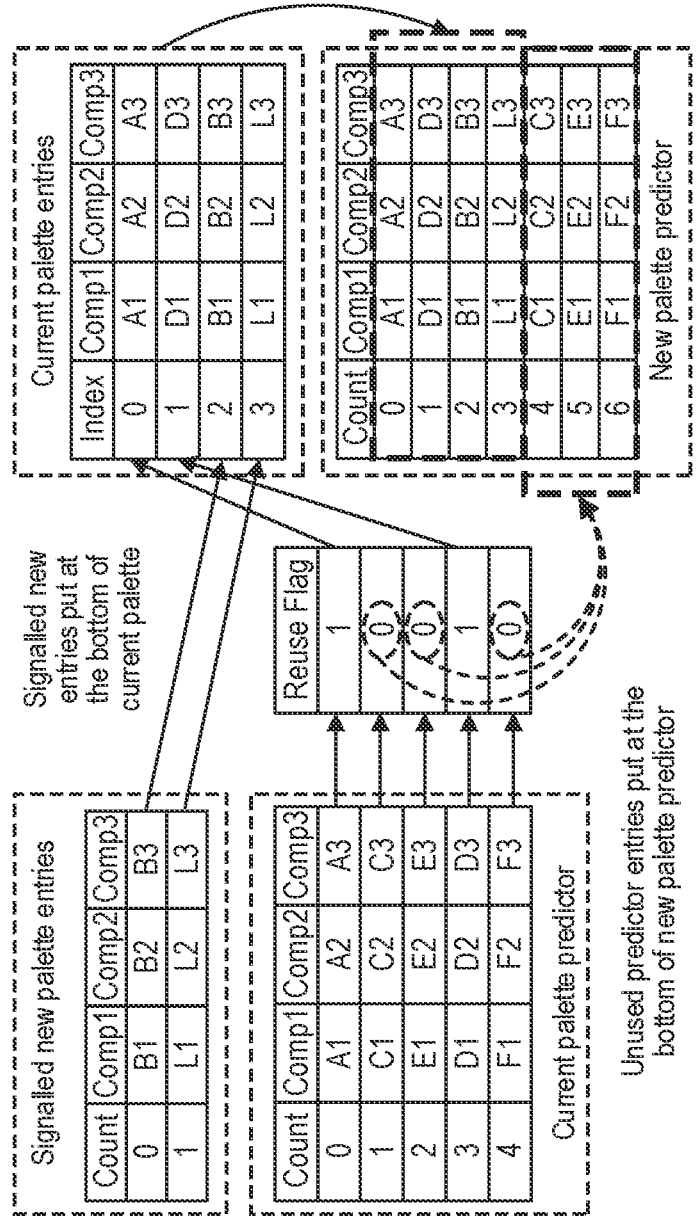
FIG. 6 illustrates a schematic diagram of an exemplary process for updating palette predictor after encoding a coding unit, according to some embodiments of the present disclosure.

For coding the palette table, a palette predictor is maintained. The palette predictor is initialized to 0 (e.g., empty) at the beginning of each slice for non-wavefront case and at the beginning of each CTU row for wavefront case. In some cases, the palette predictor can also be initialized to 0 at the beginning of the tile. FIG. 6 illustrates a schematic diagram of an exemplary process for updating palette predictor after encoding and decoding a coding unit, according to some embodiments of the present disclosure. As shown in FIG. 6, for each entry in the palette predictor, a reuse flag is signaled to indicate whether it will be included in the current palette table of the current CU. The reuse flags are sent using run-length coding of zeros, after which the number of new palette entries and the component values for the new palette entries are signaled. After encoding and/or decoding the palette coded CU, the palette predictor is updated using the current palette table, and entries from the previous palette predictor that are not reused in the current palette table are added at the end of the new palette predictor until the maximum size allowed is reached.

In some embodiments, an escape flag is signaled for each CU to indicate if escape symbols are present in the current CU. If escape symbols are present, the palette table is augmented by one and the last index is assigned to be the escape symbol (as shown in FIG. 5).

Referring to FIG. 5, palette indices of samples in a CU form a palette index map. The index map is coded using horizontal or vertical traverse scans. The scan order is explicitly signaled in the bitstream using the syntax element "palette_transpose_flag." The palette index map is coded using the index-run mode or the index-copy mode.

According to some embodiments, the tree structures of I slices are signaled through syntax element "qtbtt_dual_tree_intra_flag" in the sequence parameter set (SPS) syntax. Syntax element qtbtt_dual_tree_intra_flag equal to 1 indicates that two separate coding_tree syntax structures are used for the luma and chroma components of the I slices, respectively. Syntax element qtbtt_dual_tree_intra_flag equal to 0 indicates that separate coding tree syntax structures are not used for the luma and chroma components of the I slices. Moreover, P and B slices are always coded as single-tree slices. Consistent with the disclosed embodiments, an I picture is an intra coded picture, without referencing to other pictures in the encoding/decoding process.

Both P and B pictures are inter coded pictures, which are decoded with referencing to other pictures. The difference between the P and B pictures is that each block in the P picture can only reference to up to one block in each of the reference pictures, while each block in the B picture may reference to at most 2 blocks in each of the reference pictures.

According to some embodiments, for slices with dual luma/chroma trees, different palettes (e.g., different palette tables) are applied on luma (Y component) and chroma (Cb and Cr components) separately. In case of dual tree slices (i.e. dual luma/chroma trees), each entry of the luma palette table contains only Y value and each entry of Chroma palette table contains both Cb and Cr values. For slices of single tree, the palette is applied on Y, Cb, and Cr components jointly (e.g., each entry in the palette table contains Y, Cb, and Cr values). Moreover, for certain color formats, such as the 4:2:0 and 4:2:2 color formats, a coding unit (CU) of a single-tree slice can have separate luma and chroma trees due to the restriction on the allowable smallest chroma coding block sizes. Thus, for these color formats, a CU in a single-tree slice may have a local dual-tree structure (e.g., single tree at slice level while dual tree at CU level).

Accordingly, a coding unit of a single-tree slice can have separate luma and chroma trees, because in case of a non-inter smallest chroma intra prediction unit (SCIPU), Chroma is not allowed to be further split, but luma is allowed to be further split. In single-tree coding, an SCIPU is defined as a coding tree node whose chroma block size is larger than or equal to 16 chroma samples and has at least one child luma block smaller than 64 luma samples. As described above, the separate trees associated with SCIPU are called local dual trees.

Based on the tree type (e.g., single tree or dual tree) of a slice, two types of palette tables ("joint palette" and "separate palette") can be used for the slice. A single-tree slice can be palette coded using a joint palette table. Each entry of the joint palette table contains Y, Cb, and Cr color components, and all color components of a coding unit (CU) in the single-tree slice are coded jointly using the joint palette table (with the exception of local dual tree described above). In contrast, a dual-tree slice is palette coded using two separate palettes. The luma and chroma components of the dual-tree slice need different palette tables and are coded separately. Accordingly, for a dual-tree slice, two index maps (one for the luma component and one for the chroma components) are signaled in the bit-stream.

FIG. 7 illustrates an exemplary Table 1 showing exemplary uniform maximum predictor sizes and maximum palette sizes, according to some embodiments of the present disclosure. As shown in Table 1, the maximum palette predictor size for both joint and separate palettes are uniformly set to be to 63 and the maximum palette size for both joint and separate palette tables are uniformly set to be 31. However, as described above, two separate palette tables are needed for a dual-tree slice/CU with separate luma and chroma trees, while only one joint palette table is needed for a single-tree slice/CU with a joint luma-chroma tree. Therefore, the complexity of generating the separate palette tables for a dual-tree slice/CU is roughly double of the complexity for generating a joint palette table for a single-tree slice/CU.

To solve the imbalance in the computing complexity and time for palette coding dual-tree slice/CU versus single-tree slice/CU, consistent with some disclosed embodiments, the maximum predictor size for separate luma and chroma trees can be set lower than that for the single (e.g., joint) luma-chroma tree. Alternatively or additionally, the maximum palette size (e.g., maximum palette table size) for separate luma and chroma trees can be set lower than that for the single (e.g., joint) luma-chroma tree.

In some disclosed embodiments, the following six variables are defined to represent maximum predictor sizes and maximum palette sizes. Specially, variable "max_plt_predictor_size_joint" refers to the maximum predictor size of joint palette. Variable "max_plt_predictor_size_luma" refers to the maximum predictor sin of the luma component if separate palette is used. Variable "max_plt_predictor_size_chroma" refers to the maximum predictor size of the chroma components if separate palette is used. Variable "max_plt_size_joint" refers to the maximum palette size of joint palette. Variable "max_plt_size_luma" refers to the maximum palette size of the luma component if separate palette is used. Variable "max_plt_size_chroma" refers to the maximum palette size of the chroma component if separate palette is used.

In some embodiments, the maximum palette predictor sizes and maximum palette sizes are predefined set of fixed values and do not need to be signaled to the video decoder. FIG. 8 illustrates an exemplary Table 2 showing exemplary maximum predictor sizes and maximum palette sizes, according to some embodiments of the present disclosure.

In some embodiments, the maximum palette predictor size and maximum palette size of the dual tree slices are set to the half of the maximum palette predictor size and maximum palette size of the single tree slices. As shown in Table 2, the maximum palette predictor size and maximum palette size of joint palette (i.e. in case of single tree slices) are defined as 63 and 31, respectively. The maximum palette predictor size and maximum palette size of separate palette (i.e. in case of dual tree slices) of both luma and Chroma components are defined as 31 and 15, respectively.

FIG. 9 illustrates an exemplary Table 3 showing exemplary decoding process for using predefined maximum palette predictor sizes and maximum palette sizes, according to some embodiments of the present disclosure. As shown in Table 3, changes to the palette mode decoding process currently proposed in VVC draft 7 are emphasized in boxes 901-906 and highlighted in italics, and contents to be deleted from the palette mode decoding process currently proposed in VVC draft 7 are shown in boxes 905-906 and stricken through and emphasized in italics. In the present embodiments, if a CU is coded as local dual tree (e.g. separate luma/chroma local tree of a single tree slice), the maximum predictor size for the coding the local dual tree is set to be the maximum predictor size of joint palette.

FIG. 10 illustrates an exemplary Table 4 showing exemplary palette coding syntax table for using predefined maximum palette predictor sizes and maximum palette sizes, according to some embodiments of the present disclosure. Compared to the syntax used for implementing the uniform maximum predictor sizes and maximum palette sizes shown in Table 1, changes to the syntax are emphasized in boxes 1001-1003 and highlighted in italics in Table 4, and syntax elements to be deleted from the syntax are shown in boxes 1002-1003 and stricken through and emphasized in italics in Table 4.

In some embodiments, the maximum palette size of the joint palette and the difference between the maximum palette size of the joint palette and the maximum predictor size of the joint palette is signaled to the decoder through SIPS syntax. Exemplary semantics consistent with the present embodiments are described as follows. Syntax element "sps_max_plt_size_joint_minus1" specifies the maximum allowed palette size -1 of joint palette table. The value of syntax element sps_max_plt_size_joint_minus1 is in the range of 0 to 63, inclusive. When syntax element sps_max_plt_size_joint_minus1 is not present, its value is inferred to be 0. Moreover, syntax element "sps_delta_max_plt_predictor_size_joint" specifies the difference between the maximum allowed palette predictor size and the maximum allowed palette size of joint palette. The value of syntax element sps_delta_max_plt_predictor_size_joint is in the range of 0 to 63, inclusive. When syntax element sps_delta_max_plt_predictor_size_joint is not present, its value is inferred to be 0.

The maximum palette size and the maximum palette predictor size of separate luma/chroma palettes are not signaled. Instead, they are derived from the maximum palette size of the joint palette and the maximum palette predictor size of the joint palette. FIG. 11 illustrates an exemplary Table 5 showing exemplary derivation of maximum palette sizes and maximum palette predictor size of separate palettes, according to some embodiments of the present disclosure.

In the example shown in Table 5, the syntax element max_plt_size_joint is equally distributed to the lama and chroma components when separate luma/chroma palettes are used. Consistent with the present disclosure, the maximum palette size of the joint palette can also be unevenly distributed to the luma and chroma components. FIG. 12 illustrates an exemplary Table 6 showing another exemplary derivation of maximum palette sizes and maximum palette predictor size of separate palettes, according to some embodiments of the present disclosure. Table 6 shows an example of an uneven distribution.

FIG. 13 illustrates an exemplary Table 7 showing an exemplary sequence parameter set (SPS) syntax table, according to some embodiments of the present disclosure. Compared to the syntax used for implementing the uniform maximum predictor sizes and maximum palette sizes shown in Table 1, changes to the syntax are emphasized in box 1301 and italics in Table 7. Though not show in Table 7, it is contemplated that the maximum palette size and the maximum palette predictor size of the separate luma/chroma palettes may also be signaled in the SPS, along with the maximum palette size and the maximum palette predictor size of the joint palette.

In some embodiments, the maximum palette size and maximum palette predictor size related syntax are sent through the picture header (PH). Exemplary semantics consistent with the present embodiments are described as follows. Syntax element "pic_max_plt_size_joint_minus1" specifies the maximum allowed palette size −1 of joint palette table for the slices associated with the PH. The value of syntax element "pic_max_plt_size_joint_minus1" is in the range of 0 to 63, inclusive. Syntax element "pic_delta_max_plt_predictor_size_joint" specifies the difference between the maximum allowed palette predictor size and the maximum allowed palette size of joint palette for the slices associated with the PH. The maximum allowable value of syntax element pic_delta_max_plt_predictor_size_joint is 63. When syntax element pic_delta_max_plt_predictor_size_joint is not present, its value is inferred to be 0.

The maximum palette size and the maximum palette predictor size of separate luma/chroma palettes are not signaled. Instead, they are derived from the maximum palette size of the joint palette and the maximum palette predictor size of the joint palette. FIG. 14 illustrates an exemplary Table 8 showing another exemplary derivation of maximum palette sizes and maximum palette predictor size of separate palettes, according to some embodiments of the present disclosure.

In the example shown in Table 8, the syntax element max_plt_size_joint is equally distributed to the luma and chroma components when separate luma/chroma palettes are used. Consistent with the present disclosure, the maximum palette size of joint table can also be unevenly distributed to the luma and chroma components. FIG. 15 illustrates an exemplary Table 9 showing another exemplary derivation of maximum palette sizes and maximum palette predictor size of separate palettes, according to some embodiments of the present disclosure. Table 9 shows an example of the uneven distribution.

FIG. 16 illustrates an exemplary Table 10 showing an exemplary PH syntax, according to some embodiments of the present disclosure. Compared to the syntax used for implementing the uniform maximum predictor sizes and maximum palette sizes shown in Table 1, changes to the syntax are emphasized in box 1601 and highlighted in italics in Table 10. Though not show in Table 10, it is contemplated that the maximum palette size and the maximum palette predictor size of the separate luma/chroma palettes may also be signaled in the picture header, along with the maximum palette size and the maximum palette predictor size of the joint palette.

In some embodiments, the syntax related to the maximum palette sizes and maximum palette predictor sizes are signaled at each slice through the slice header. Exemplary semantics consistent with the present embodiments are described as follows.

Specifically, syntax element "slice_max_plt_size_joint_minus1" and syntax element "slice_delta_max_plt_predicto_size_joint" are conditionally signaled if the slice is coded as a single-tree slice. Syntax element slice_max_plt_size_joint_minus1 specifies the maximum allowed palette size −1 of the joint palette table for the single-tree slice. It is a requirement of bitstream conformance that the maximum value of syntax element slice_max_plt_size_joint is 63. Syntax element slice_delta_max_plt_predictor_size_joint specifies the difference between the maximum allowed palette predictor size and the maximum allowed palette size of joint palette for the single-tree slice. The maximum allowable value of syntax element slice_delta_max_plt_predictor_size_joint is 63. When syntax element slice_delta_max_plt_predictor_size_joint is not present, its value is inferred to be 0.

Syntax element "slice_max_plt_size_luma_minus1" and syntax element "slice_delta_max_plt_predictor_size_luma" are conditionally signaled if the slice is coded as dual-tree slice. Syntax element slice_max_plt_luma_minus1 specifies the maximum allowed palette size −1 of luma palette table for the dual-tree slice, When syntax element slice_max_plt_size_luma is not present, its value is inferred to be 0. Is a requirement of bitstream conformance that the maximum value of syntax element slice_max_plt_size _luma_minus is 63. Syntax element slice_delta_max_plt_predictor_size_luma specifies the difference between the maximum allowed palette predictor size and the maximum allowed palette size of luma palette for the dual-tree slice. The maximum allowable value of syntax element slice_delta_max_plt_predictor_size_luma is 63. When syntax element slice_delta_max_plt_predictor_size_luma is not present, its value is inferred to be 0.

FIG. 17 illustrates an exemplary Table 11 showing an exemplary derivation of maximum palette sizes and maximum palette predictor sizes for I, P, and B slices, according to some embodiments of the present disclosure.

FIG. 18 illustrates an exemplary Table 12 showing an exemplary SH syntax, according to some embodiments of the present disclosure. Compared to the syntax used for implementing the uniform maximum predictor sizes and maximum palette sizes shown in Table 1, changes to the syntax are emphasized in box 1801 and highlighted in italics in Table 12. The prediction update procedure consistent with the present embodiments is the same as that shown in Table 3, and the palette coding syntax consistent with the present embodiments is the same as that shown in Table 4.

Figure 19:
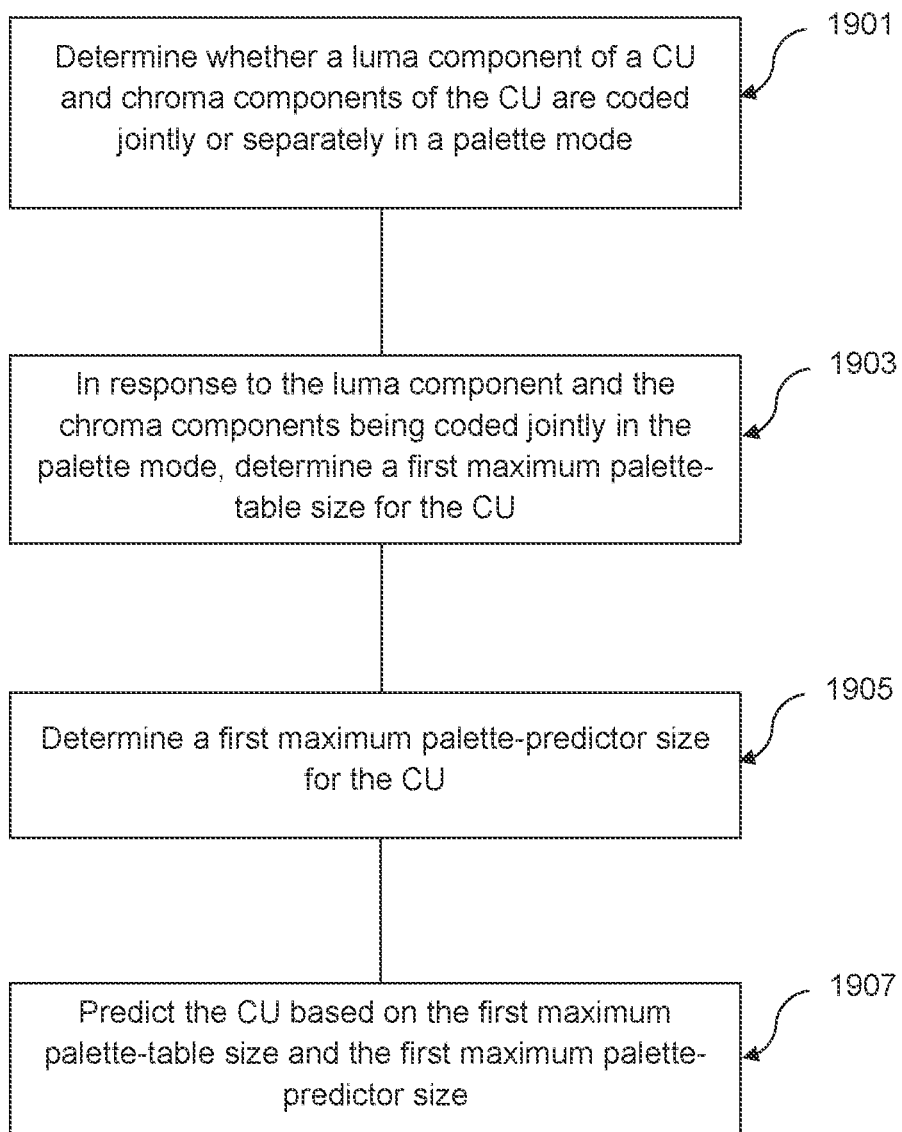
FIG. 19 illustrates a flowchart of an exemplary palette coding method, according to some embodiments of the present disclosure.

FIG. 19 illustrates a flowchart of an exemplary palette coding method 1900, according to some embodiments of the present disclosure. Method 1900 can be performed by an encoder (e.g., by process 200A of FIG. 2A or 200B of FIG. 2B), a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 1900. In some embodiments, method 1900 can be implemented by a computer program product, embodied in a computer-readable medium, including computer-executable instructions, such as program code, executed by computers (e.g., apparatus 400 of FIG. 4).

At step 1901, a determination can be made on whether a luma component of a CU and chroma components of the CU are coded jointly or separately in a palette mode. For example, a variable treeType can be utilized to indicate whether the luma component of the CU and chroma components of the CU are coded jointly or separately in a palette mode (e.g, as shown in Table 3 of FIG. 9 or Table 4 of FIG. 10).

At step 1903, in response to the luma component and the chroma components being coded jointly in the palette mode, a first maximum palette-table size for the CU can be determined. In some embodiments, the first maximum palette-table size for the CU can be determined based on a value of a first syntax element (e.g., syntax element sps_max_plt_size_joint_minus1 shown in Table 7 of FIG. 13 or syntax element pic_max_plt_size_joint_minus1 shown in Table 10 of FIG. 16) signaled in a video bitstream.

At step 1905, in response to the luma component and the chroma components being coded jointly in the palette mode, a first maximum palette-predictor size for the CU can be determined. In some embodiments, the first maximum palette-predictor size for the CU can be determined based on the value of the first syntax element and a value of a second syntax element (e.g., syntax element sps_delta_max_plt_predictor_size_joint shown in Table 7 of FIG. 13 or syntax element pic_delta_max_plt_predictor_size_joint shown in Table 10 of FIG. 16) signaled in the video bitstream. For example, the first maximum palette-predictor size for the CU can be determined to be a sum of the value of the first syntax element and the value of the second syntax element (e.g., as shown in Table 5 of FIG. 11, Table 6 of FIG. 12, Table 8 of FIG. 14, or Table 9 of FIG. 15). In sonic embodiments, the first syntax element and second syntax element are signaled in a SPS (e.g., as shown in Table 7 of FIG. 13) associated with the CU or in a PH (e.g., as shown in Table 10 of FIG. 16) associated with the CU.

At step 1907, in response to the luma component and the chroma components being coded jointly in the palette mode, the CU can be predicted based on the first maximum palette-table size and the first maximum palette-predictor size. For example, the CU can be predicted as shown in Table 3 of FIG. 9.

In some embodiments, method 1900 can include: in response to the luma component and the chroma components being coded separately in the palette mode, determining a second maximum palette-table size for the CU based on the first maximum palette-table size, determining a second maximum palette-predictor size for the CU based on the first maximum palette-predictor size, and predicting the CU based on the second maximum palette-table size and the second maximum palette-predictor size. The second maximum palette-table size or the second maximum palette-predictor size is for the luma component or the chroma component. For example, the maximum palette-table size or maximum palette-predictor size for the luma component or the chroma component can be determined based on Table 5 of FIG. 11, Table 6 of FIG. 12, Table 8 of FIG. 14, or Table 9 of FIG. 15.

In some embodiment, method 1900 can include determining the first maximum palette-table size for the CU to be a first predetermined value. Method 1900 can also include determining the first maximum palette-predictor size for the CU to be a second predetermined value. For example, the maximum palette-table size for joint palette can be 31 and the maximum palette-predictor size for joint palette can be 63, as shown in Table 2 of FIG. 8. In some embodiments, method 1900 can include: in response to the luma component and the chroma components being coded separately in the palette mode, determining a third maximum palette-table size for the CU to be a third predetermined value, and predicting the CU based on the third maximum palette-table size. The third predetermined value is smaller than the first predetermined value. For example, as shown in Table 2 of FIG. 8, the maximum palette-table size for luma or chroma palette can be 15.

In some embodiments, method 1900 can include in response to the luma component and the chroma components being coded separately in the palette mode and the CU being part of a single-tree slice, predicting the CU based on the first maximum palette-predictor size (e.g., as shown in Table 3 of FIG. 9).

In some embodiments, method 1900 can include in response to the luma component and the chroma components being coded separately in the palette mode and the CU being not part of a single-tree slice, determining a third maximum palette-predictor size for the CU to be a fourth predetermined value, and predicting the CU based on the third maximum palette-predictor size. The fourth predetermined value is smaller than the second predetermined value. For example, as shown in Table 2 of FIG. 8, the maximum palette-predictor size for separate palette can be 31. The CU can be predicted as shown in Table 3 of FIG. 9.

In some embodiments, method 1900 can include: determining whether a picture slice comprising the CU is a single-tree slice or a dual-tree slice, in response to the picture slice being a single-tree slice, determining the first maximum palette-table size for the CU in the picture slice, based on a value of a third syntax element signaled in a slice header of the picture slice, and determining the first maximum palette-predictor size for the CU, based on the value of the third syntax element and a value of a fourth syntax element signaled in the slice header. The first maximum palette-predictor size for the CU can be determined to be a sum of the value of the third syntax element and the value of the fourth syntax element. For example, as shown in Table 11 of FIG. 17, in response to the picture slice being a single-tree slice (e.g., slice_type !=I||qtbtt_dual_tree_intra_flag==0), the maximum palette-table size for joint palette can be determined based on a value of a syntax element slice_max_plt_size_joint_minus1 signaled in a slice header (e.g., the SH as shown in Table 12 of FIG. 18) and the maximum palette-predictor size for joint palette can be determined to be a sum of the value of the syntax element slice_max_plt_size_joint_minus1 and a value of a syntax element slice_delta_max_plt_predictor_size_joint signaled in the slice header (e.g., the SH as shown in Table 12 of FIG. 18).

In some embodiments, method 1900 can include: in response to the picture slice being a dual-tree slice, determining a fourth maximum palette-table size for the CU, based on a value of a fifth syntax element signaled in the slice header, determining a fourth maximum palette-predictor size for the CU, based on the value of the fifth syntax element and a value of a sixth syntax element signaled in the slice header, and predicting the CU based on the fourth maximum palette-table size and the fourth maximum palette-predictor size. The fourth maximum palette-predictor size for the CU can be determined to be a sum of the value of the fifth syntax element and the value of the sixth syntax element. For example, as shown in Table 11 of FIG. 17, in response to the picture slice being a dual-tree slice, the maximum palette-table size for luma or chroma palette can be determined based on a value of a syntax element slice_max_plt_size_luma_minus1 signaled in a slice header (e.g., the SH as shown in Table 12 of FIG. 18) and the maximum palette-predictor size for luma or chroma palette can be determined to be a sum of the value of the syntax element slice_max_plt_size_luma_minus1 and a value of a syntax element slice_delta_max_plt_predictor_size_luma signaled in the slice header (e.g., the SH as shown in Table 12 of FIG. 18).

The embodiments may further be described using the following clauses:

1. A palette coding method, comprising:
   determining whether a luma component of a coding unit (CU) and chroma components of the CU are coded jointly or separately in a palette mode; and
   in response to the luma component and the chroma components being coded jointly in the palette mode,
      determining a first maximum palette-table size for the CU;
      determining a first maximum palette-predictor size for the CU; and
      predicting the CU based on the first maximum palette-table size and the first maximum palette-predictor size.
2. The method of clause 1, wherein determining the first maximum palette-table size for the CV comprises:
   determining the first maximum palette-table size for the CU based on a value of a first syntax element signaled in a video bitstream.
3. The method of clause 2, wherein determining the first maximum palette-predictor size for the CU comprises:
   determining the first maximum palette-predictor size for the CU based on the value of the first syntax element and a value of a second syntax element signaled in the video bitstream.
4. The method of clause 3, wherein determining the first maximum palette-predictor size for the CU comprises:
   determining the first maximum palette-predictor size for the CU to be a sum of the value of the first syntax element and the value of the second syntax element.
5. The method of any one of clauses 3 and 4, wherein the first syntax element and second syntax element are signaled in a sequence parameter set (SPS) associated with the CU.
6. The method of any one of clauses 3 and 4, wherein the first syntax element and second syntax element are signaled in a picture header (PH) associated with the CU.
7. The method of any one of clauses 1-6, further comprising:
   in response to the lama component and the chroma components being coded separately in the palette mode,
      determining a second maximum palette-table size for the CU based on the first maximum palette-table size,
      determining a second maximum palette-predictor size for the CU based on the first maximum palette-predictor size, and
      predicting the CU based on the second maximum palette-table size and the second maximum palette-predictor size.
8. The method of clause 7, wherein the second maximum palette-table size or the second maximum palette-predictor size is for the luma component or the chroma component.
9. The method of clause 1, wherein determining the first maximum palette-table size for the CU comprises:
   determining the first maximum palette-table size for the CU to be a first predetermined value.
10. The method of any one of clauses 1 and 9, wherein determining the first maximum palette-predictor size for the CU comprises:
    determining the first maximum palette-predictor size for the CU to be a second predetermined value.
11. The method of any one of clauses 9 and 10, further comprising:
    in response to the luma component and the chroma components being coded separately in the palette mode,
       determining a third maximum palette-table size for the CU to be a third predetermined value; and
       predicting the CU based on the third maximum palette-table size,
       wherein the third predetermined value is smaller than the first predetermined value.
12. The method of clause 11, further comprising:
    in response to the luma component and the chroma components being coded separately in the palette mode and the CU being part of a single-tree slice, predicting the CU based on the first maximum palette-predictor size.
13. The method of any one of clauses 10-12, further comprising:
    in response to the lama component and the chroma components being coded separately in the palette mode and the CU being not part of a single-tree slice,
       determining a third maximum palette-predictor size for the CU to be a fourth predetermined value; and
       predicting the CU based on the third maximum palette-predictor size,
       wherein the fourth predetermined value is smaller than the second predetermined value.
14. The method of clause 1, further comprising:
    determining whether a picture slice comprising the CU is a single-tree slice or a dual-tree slice; and
    in response to the picture slice being a single-tree slice,
       determining the first maximum palette-table size for the CU in the picture slice, based on a value of a third syntax element signaled in a slice header of the picture slice; and determining the first maximum palette-predictor size for the CU, based on the value of the third syntax element and a. value of a fourth syntax element signaled in the slice header.
15. The method of clause 14, wherein determining the first maximum palette-predictor size for the CU comprises:
determining the first maximum palette-predictor size for the CU to be a sum of the value of the third syntax element and the value of the fourth syntax element.
16. The method of any one of clauses 14 and 15, further comprising:
in response to the picture slice being a dual-tree slice,
determining a fourth maximum palette-table size for the CU, based on a value of a fifth syntax element signaled in the slice header,
determining a fourth maximum palette-predictor size for the CU, based on the value of the fifth syntax element and a value of a sixth syntax element signaled in the slice header, and
predicting the CU based on the fourth maximum palette-table size and the fourth maximum palette-predictor size.
17. The method of clause 16, wherein determining the fourth maximum palette-predictor size for the CU comprises:
determining the fourth maximum palette-predictor size for the CU to be a sum of the value of the fifth syntax element and the value of the sixth syntax element.
18. A video processing apparatus, comprising
at least one memory for storing instructions; and
at least one processor configured to execute the instructions to cause the apparatus to perform:
determining whether a luma component of a coding unit (CU) and chroma components of the CU are coded jointly or separately in a palette mode; and
in response to the luma component and the chroma components being coded jointly in the palette mode, determining a first maximum palette-table size for the CU;
determining a first maximum palette-predictor size for the CU; and
predicting the CU based on the first maximum palette-table size and the first maximum palette-predictor size.
19. The apparatus of clause 18, wherein the at least one processor is configured to execute the instructions to cause the apparatus to perform:
determining the first maximum palette-table size for the CU based on a value of a first syntax element signaled in a video bitstream.
20. The apparatus of clause 19, wherein the at least one processor is configured to execute the instructions to cause the apparatus to perform:
determining the first maximum palette-predictor size for the CU based on the value of the first syntax element and a value of a second syntax element signaled in the video bitstream.
21. The apparatus of clause 20, wherein the at least one processor is configured to execute the instructions to cause the apparatus to perform:
determining the first maximum palette-predictor size for the CU to be a sum of the value of the first syntax element and the value of the second syntax element.
22. The apparatus of any one of clauses 20 and 21, wherein the first syntax element and second syntax element are signaled in a sequence parameter set (SPS) associated with the CU.
23. The apparatus of any one of clauses 20 and 21, wherein the first syntax element and second syntax element are signaled in a picture header (PH) associated with the CU.
24. The apparatus of any one of clauses 18-23, wherein the at least one processor is configured to execute the instructions to cause the apparatus to perform:
in response to the luma component and the chroma components being coded separately in the palette mode,
determining a second maximum palette-table size for the CU based on the first maximum palette-table size,
determining a second maximum palette-predictor size for the CU based on the first maximum palette-predictor size, and
predicting the CU based on the second maximum palette-table size and the second maximum palette-predictor size.
25. The apparatus of clause 24, wherein the second maximum palette-table size or the second maximum palette-predictor size is for the luma component or the chroma component.
26. The apparatus of clause 18, wherein the at least one processor is configured to execute the instructions to cause the apparatus to perform:
determining the first maximum palette-table size for the CU to be a first predetermined value.
27. The apparatus of any one of clauses 18 and 26, wherein the at least one processor is configured to execute the instructions to cause the apparatus to perform:
determining the first maximum palette-predictor size for the CU to be a second predetermined value.
28. The apparatus of any one of clauses 26 and 27, wherein the at feast one processor is configured to execute the instructions to cause the apparatus to perform:
in response to the luma component and the chroma components being coded separately in the palette mode,
determining a third maximum palette-table size for the CU to be a third. predetermined value; and
predicting the CU based on the third maximum palette-table size,
wherein the third predetermined value is smaller than the first predetermined value.
29. The apparatus of clause 28, wherein the at least one processor is configured to execute the instructions to cause the apparatus to perform:
in response to the luma component and the chroma components being coded separately in the palette mode and the CU being part of a single-tree slice, predicting the CU based on the first maximum palette-predictor size.
30. The apparatus of any one of clauses 27-29, wherein the at least one processor is configured to execute the instructions to cause the apparatus to perform:
in response to the luma component and the chroma components being coded separately in the palette mode and the CU being not part of a single-tree slice,
determining a third maximum palette-predictor size for the CU to be a fourth predetermined value; and
predicting the CU based on the third maximum palette-predictor size,
wherein the fourth predetermined value is smaller than the second predetermined value.

31. The apparatus of clause 18, wherein the at least one processor is configured to execute the instructions to cause the apparatus to perform:
determining whether a picture slice comprising the CU is a single-tree slice or a dual-tree slice; and
in response to the picture slice being a single-tree slice,
    determining the first maximum palette-table size for the CU in the picture slice, based on a value of a third syntax element signaled in a slice header of the picture slice; and
    determining the first maximum palette-predictor size for the CU, based on the value of the third syntax element and a value of a fourth syntax element signaled in the slice header.
32. The apparatus of clause 31, wherein the at least one processor is configured to execute the instructions to cause the apparatus to perform:
determining the first maximum palette-predictor size for the CU to be a sum of the value of the third syntax element and the value of the fourth syntax element.
33. The apparatus of any one of clauses 31 and 32, wherein the at east one processor is configured to execute the instructions to cause the apparatus to perform:
in response to the picture slice being a dual-tree slice,
    determining a fourth maximum palette-table size for the CU, based on a value of a fifth syntax element signaled in the slice header,
    determining a fourth maximum palette-predictor size for the CU, based on the value of the fifth syntax element and a value of a sixth syntax element signaled in the slice header, and
    predicting the CU based on the fourth maximum palette-table size and the fourth maximum palette-predictor size.
34. The apparatus of clause 33, wherein the at least one processor is configured to execute the instructions to cause the apparatus to perform:
determining the fourth maximum palette-predictor size for the CU to be a sum of the value of the fifth syntax element and the value of the sixth syntax element.
35. A non-transitory computer readable storage medium storing a set of instructions that are executable by one or more processing devices to cause a video processing apparatus to perform a method comprising:
determining whether a luma component of a coding unit (CU) and chroma components of the CU are coded jointly or separately in a palette mode; and
in response to the luma component and the chroma components being coded jointly in the palette mode,
    determining a first maximum palette-table size for the CU;
    determining a first maximum palette-predictor size for the CU; and
    predicting the CU based on the first maximum palette-table size and the first maximum palette-predictor size.
36. The non-transitory computer readable storage medium of clause 35, wherein the set of instructions are executable by the one or more processing devices to cause the video processing apparatus to perform:
determining the first maximum palette-table size for the CU based on a value of a first syntax element signaled in a video bitstream.
37. The non-transitory computer readable storage medium of clause 36, wherein the set of instructions are executable by the one or more processing devices to cause the video processing apparatus to perform:
determining the first maximum palette-predictor size for the CU based on the value of the first syntax element and a value of a second syntax element signaled in the video bitstream.
38. The non-transitory computer readable storage medium of clause 37, wherein the set of instructions are executable by the one or more processing devices to cause the video processing apparatus to perform:
determining the first maximum palette-predictor size for the CU to be a sum of the value of the first syntax element and the value of the second syntax element.
39. The non-transitory computer readable storage medium of any one of clauses 37 and 38, wherein the first syntax element and second syntax element are signaled in a sequence parameter set (SPS) associated with the CU.
40. The non-transitory computer readable storage medium of any one of clauses 37 and 38, wherein the first syntax element and second syntax element are signaled in a picture header (PH) associated with the CU.
41. The non-transitory computer readable storage medium of any one of clauses 35-40, wherein the set of instructions are executable by the one or more processing devices to cause the video processing apparatus to perform:
in response to the luma component and the chroma components being coded separately in the palette mode,
    determining a second maximum palette-table size for the CU based on the first maximum palette-table size,
    determining a second maximum palette-predictor size for the CU based on the first maximum palette-predictor size, and
    predicting the CU based on the second maximum palette-table size and the second maximum palette-predictor size.
42. The non-transitory computer readable storage medium of clause 41, wherein the second maximum palette-table size or the second maximum palette-predictor size is for the luma component or the chroma component.
43. The non-transitory computer readable storage medium of clause 35, wherein the set of instructions are executable by the one or more processing devices to cause the video processing apparatus to perform:
determining the first maximum palette-table size for the CU to be a first predetermined value.
44. The non-transitory computer readable storage medium of any one of clauses 35 and 43, wherein the set of instructions are executable by the one or more processing devices to cause the video processing apparatus to perform:
determining the first maximum palette-predictor size for the CU to be a second predetermined value.
45. The on-transitory computer readable storage medium of any one of clauses 43 and 44, wherein the set of instructions are executable by the one or more processing devices to cause the video processing apparatus to perform:
in response to the lama component and the chroma components being coded separately in the palette mode,
    determining a third maximum palette-table size for the CU to be a third predetermined value; and
    predicting the CU based on the third maximum palette-table size, wherein the third predetermined value is smaller than the first predetermined value.

46. The non-transitory computer readable storage medium of clause 45, wherein the set of instructions are executable by the one or more processing devices to cause the video processing apparatus to perform:
in response to the luma component and the chroma components being coded separately in the palette mode and the CU being part of a single-tree slice, predicting be CU based on the first maximum palette-predictor size.

47. The non-transitory computer readable storage medium of any one of clauses 44-46, wherein the set of instructions are executable by the one or more processing devices to cause the video processing apparatus to perform:
in response to the luma component and the chroma components being coded separately in the palette mode and the CU being not part of a single-tree slice,
determining a third maximum palette-predictor size for the CU to be a fourth predetermined value; and
predicting the CU based on the third maximum palette-predictor size,
wherein the fourth predetermined value is smaller than the second predetermined value.

48. The non-transitory computer readable storage medium of clause 35, wherein the set of instructions are executable by the one or more processing devices to cause the video processing apparatus to perform:
determining whether a picture slice comprising the CU is a single-tree slice or a dual-tree slice; and
in response to the picture slice being a single-tree slice,
determining the first maximum palette-table size for the CU in the picture slice, based on a value of a third syntax element signaled in a slice header of the picture slice; and
determining the first maximum palette-predictor size for the CU, based on the value of the third syntax element and a value of a fourth syntax element signaled in the slice header.

49. The non-transitory computer readable storage medium of clause 48, wherein the set of instructions are executable by the one or more processing devices to cause the video processing apparatus to perform:
determining the first maximum palette-predictor size for the CU to be a sum of the value of the third syntax element and the value of the fourth syntax element.

50. The non-transitory computer readable storage medium of any one of clauses 48 and 49, wherein the set of instructions are executable by the one or more processing devices to cause the video processing apparatus to perform:
in response to the picture slice being a dual-tree slice,
determining a fourth maximum palette-table size for the CU, based on a value of a fifth syntax element signaled in the slice header,
determining a fourth maximum palette-predictor size for the CU, based on the value of the fifth syntax element and a value of a sixth syntax element signaled in the slice header, and
predicting the CU based on the fourth maximum palette-table size and the fourth maximum palette-predictor size.

51. The non-transitory computer readable storage medium of clause 50, wherein the set of instructions are executable by the one or more processing devices to cause the video processing apparatus to perform:

determining the fourth maximum palette-predictor size for the CU to be a sum of the value of the fifth syntax element and the value of the sixth syntax element.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation fr©m another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A palette coding method, comprising:
 determining whether a luma component of a coding unit (CU) and chroma components of the CU are coded jointly or separately in a palette mode; and
 in response to the luma component and the chroma components being coded jointly in the palette mode,
  determining a first maximum joint palette-table size for the CU;
  determining a first maximum joint palette-predictor size for the CU; and
  predicting the CU based on the first maximum joint palette-table size and the first maximum joint palette-predictor size.

2. The method of claim 1, wherein determining the first maximum joint palette-table size for the CU comprises:
 determining the first maximum joint palette-table size for the CU based on a value of a first syntax element signaled in a video bitstream; and
 determining the first maximum joint palette-predictor size for the CU based on the value of the first syntax element and a value of a second syntax element signaled in the video bitstream.

3. The method of claim 2, wherein determining the first maximum joint palette-predictor size for the CU comprises:
 determining the first maximum joint palette-predictor size for the CU to be a sum of the value of the first syntax element and the value of the second syntax element.

4. The method of claim 2, wherein the first syntax element and second syntax element are signaled in a sequence parameter set (SPS) or a picture header (PH) associated with the CU.

5. The method of claim 1, further comprising:
 in response to the luma component and the chroma components being coded separately in the palette mode,
  determining a second maximum palette-table size for the CU based on the first maximum joint palette-table size,
  determining a second maximum palette-predictor size for the CU based on the first maximum joint palette-predictor size, and
  predicting the CU based on the second maximum palette-table size and the second maximum palette-predictor size.

6. The method of claim 1, wherein determining the first maximum joint palette-table size for the CU comprises:
 determining the first maximum joint palette-table size for the CU to be a first predetermined value; and
 determining the first maximum joint palette-predictor size for the CU to be a second predetermined value.

7. The method of claim 6, wherein:
 the first predetermined value is 31; and
 the second predetermined value is 63.

8. The method of claim 6, further comprising:
 in response to the luma component and the chroma components being coded separately in the palette mode,
  determining a third maximum palette-table size for the CU to be a third predetermined value; and
  predicting the CU based on the third maximum palette-table size,
  wherein the third predetermined value is smaller than the first predetermined value.

9. The method of claim 8, wherein the third predetermined value is 15.

10. The method of claim 8, further comprising:
 in response to the luma component and the chroma components being coded separately in the palette mode and the CU being part of a single-tree slice, predicting the CU based on the first maximum joint palette-predictor size.

11. The method of claim 8, further comprising:
 in response to the luma component and the chroma components being coded separately in the palette mode and the CU being not part of a single-tree slice,
  determining a third maximum palette-predictor size for the CU to be a fourth predetermined value; and
  predicting the CU based on the third maximum palette-predictor size,
  wherein the fourth predetermined value is smaller than the second predetermined value.

12. The method of claim 11, wherein the fourth predetermined value is 31.

13. The method of claim 1, further comprising:
 determining whether a picture slice comprising the CU is a single-tree slice or a dual-tree slice; and
 in response to the picture slice being a single-tree slice,
  determining the first maximum joint palette-table size for the CU in the picture slice, based on a value of a third syntax element signaled in a slice header of the picture slice; and
  determining the first maximum joint palette-predictor size for the CU, based on the value of the third syntax element and a value of a fourth syntax element signaled in the slice header.

14. The method of claim 13, further comprising:
 in response to the picture slice being a dual-tree slice,
  determining a fourth maximum palette-table size for the CU, based on a value of a fifth syntax element signaled in the slice header,
  determining a fourth maximum palette-predictor size for the CU, based on the value of the fifth syntax element and a value of a sixth syntax element signaled in the slice header, and
  predicting the CU based on the fourth maximum palette-table size and the fourth maximum palette-predictor size.

15. A video processing apparatus, comprising:
 at least one memory for storing instructions; and
 at least one processor configured to execute the instructions to cause the apparatus to perform:
  determining whether a luma component of a coding unit (CU) and chroma components of the CU are coded jointly or separately in a palette mode; and
  in response to the luma component and the chroma components being coded jointly in the palette mode,
   determining a first maximum joint palette-table size for the CU;
   determining a first maximum joint palette-predictor size for the CU; and
   predicting the CU based on the first maximum joint palette-table size and the first maximum joint palette-predictor size.

16. A non-transitory computer readable storage medium storing a set of instructions that are executable by one or more processing devices to cause a video processing apparatus to perform a method comprising:
- determining whether a luma component of a coding unit (CU) and chroma components of the CU are coded jointly or separately in a palette mode; and
- in response to the luma component and the chroma components being coded jointly in the palette mode,
  - determining a first maximum joint palette-table size for the CU;
  - determining a first maximum joint palette-predictor size for the CU; and
  - predicting the CU based on the first maximum joint palette-table size and the first maximum joint palette-predictor size.

17. The non-transitory computer readable storage medium of claim 16, wherein the set of instructions are executable by the one or more processing devices to cause the video processing apparatus to perform:
- determining the first maximum joint palette-table size for the CU based on a value of a first syntax element signaled in a video bitstream; and
- determining the first maximum joint palette-predictor size for the CU based on the value of the first syntax element and a value of a second syntax element signaled in the video bitstream.

18. The non-transitory computer readable storage medium of claim 16, wherein the set of instructions are executable by the one or more processing devices to cause the video processing apparatus to perform:
- in response to the luma component and the chroma components being coded separately in the palette mode,
  - determining a second maximum palette-table size for the CU based on the first maximum joint palette-table size,
  - determining a second maximum palette-predictor size for the CU based on the first maximum joint palette-predictor size, and
  - predicting the CU based on the second maximum palette-table size and the second maximum palette-predictor size.

19. The non-transitory computer readable storage medium of claim 16, wherein the set of instructions are executable by the one or more processing devices to cause the video processing apparatus to perform:
- determining the first maximum joint palette-table size for the CU to be a first predetermined value; and
- determining the first maximum joint palette-predictor size for the CU to be a second predetermined value.

20. The non-transitory computer readable storage medium of claim 19, wherein the set of instructions are executable by the one or more processing devices to cause the video processing apparatus to perform:
- in response to the luma component and the chroma components being coded separately in the palette mode,
  - determining a third maximum palette-table size for the CU to be a third predetermined value; and
  - predicting the CU based on the third maximum palette-table size,
  - wherein the third predetermined value is smaller than the first predetermined value.

* * * * *